United States Patent
Kim et al.

(10) Patent No.: US 7,289,301 B2
(45) Date of Patent: Oct. 30, 2007

(54) VOICE COIL MOTOR COUPLING STRUCTURE OF HARD DISK DRIVE

(75) Inventors: Do-wan Kim, Suwon-si (KR); Byoung-gyou Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 452 days.

(21) Appl. No.: 10/677,329

(22) Filed: Jan. 22, 2004

(65) Prior Publication Data
US 2004/0105190 A1 Jun. 3, 2004

(30) Foreign Application Priority Data
Oct. 4, 2002 (KR) .................. 10-2002-0060525

(51) Int. Cl.
*G11B 5/55* (2006.01)
(52) U.S. Cl. .................. 360/264.7; 360/264.8
(58) Field of Classification Search ........... 360/264.7, 360/264.8, 264.9, 264.3, 264.1, 264, 260, 360/240, 266.4, 266.7, 266.8
See application file for complete search history.

(56) References Cited

U.S. PATENT DOCUMENTS
6,608,732 B2* 8/2003 Bernett et al. .......... 360/97.02

FOREIGN PATENT DOCUMENTS
KR 1999-013411 2/1999

OTHER PUBLICATIONS
Korean Office Action for corresponding Korean Application No. 2002-60525 mailed Sep. 21, 2004.

* cited by examiner

*Primary Examiner*—Julie Anne Watko
(74) *Attorney, Agent, or Firm*—Staas & Halsey LLP

(57) ABSTRACT

A voice coil motor coupling structure of a hard disk drive for coupling a voice coil motor to a base plate of the hard disk drive, the voice coil motor includes a coil coupled to a rear end portion of an actuator arm, an upper yoke and a lower yoke provided at upper and lower portions of the coil, respectively, separated at a predetermined distance from the coil, and a magnet attached to the lower surface of the upper yoke. The voice coil motor coupling structure includes a countersink formed in the lower yoke, a countersunk head screw inserted in the countersink and coupled to a screw coupling hole provided in the base plate to fix the lower yoke to the base plate, a boss insertion hole formed in each of the lower and upper yokes at both end portions in a lengthwise direction, a boss protruding from the base plate and inserted in each of the boss insertion holes to prevent horizontal movements of the lower yoke and the upper yoke, and a screw inserted in each of the boss insertion holes and coupled to a screw coupling hole provided at each boss to fixedly couple the upper yoke to the lower yoke. Thus, the lower yoke of the voice coil motor can be stably fixed at an accurate position not only on a flat type base plate but also on a bowl type base plate.

13 Claims, 6 Drawing Sheets

VOICE COIL MOTOR COUPLING STRUCTURE OF HARD DISK DRIVE

CROSS-REFERENCE TO RELATED APPLICATIONS

This application claims the priority of Korean Patent Application No. 2002-60525 filed on Oct. 4, 2002 in the Korean Intellectual Property Office, the disclosure of which is incorporated herein by reference.

BACKGROUND OF THE INVENTION

1. Field of the Invention

The present invention relates to a hard disk drive, and more particularly, to a voice coil motor coupling structure of a hard disk drive for coupling a voice coil motor which pivots an actuator to a base plate.

2. Description of the Related Art

Hard disk drives (HDDs) are auxiliary memory devices for a computer which record and reproduce data on a magnetic disk using a magnetic head.

FIG. 1 is a plan view illustrating a conventional hard disk drive. FIG. 2 is a perspective view illustrating a conventional actuator and a conventional voice coil motor.

Referring to FIGS. 1 and 2, a conventional hard disk drive comprises a magnetic disk (hard disk) 20 which is a recording medium where data is recorded, a spindle motor 30 installed on a base plate 10 and rotating the magnetic disk 20, and an actuator 40 having a magnetic head 41 to record data on the magnetic disk 20 and reproduce the data from the disk 20.

In general, one or more magnetic disks 20 separated at a predetermined distance from each other are installed to be rotated by the spindle motor 30. On the disk 20, a parking zone 21 is provided at the inner circumferential side of the disk 20 and a data zone 22 where a magnetic signal is recorded is provided outside the parking zone 21. A slider 42 is disposed in the parking zone 21 when the power is turned off.

The actuator 40 is installed on the base plate 10 and pivots around a pivot shaft 47 provided on the base plate 10. The actuator 40 has an arm 46 in which a pivot hole 48 is formed in the middle portion thereof so that the actuator 40 can be coupled to the pivot shaft 47. A suspension 44 installed at one end portion of the arm is elastically supporting the slider 42 having the magnetic head 41 toward a surface of the magnetic disk 20.

The actuator 40 pivots by a voice coil motor (VCM) 50. The VCM 50 has a coil 56 coupled to the other end portion of the arm 46. A lower yoke 51 is fixedly installed on the base plate 10 under the coil 56 separated by a predetermined distance. An upper yoke 52 is installed above the coil 56 and coupled to the lower yoke 51 by a screw 59. Magnets 53 and 54 are attached to the upper surface of the lower yoke 51 and the lower surface of the upper yoke 52, respectively. The respective magnets 53 and 54 are separated a predetermined distance from the coil 56.

An actuator locking apparatus is provided for locking the actuator 40 when the slider 42 is disposed in the parking zone 21 of the magnetic disk 20. The actuator locking apparatus comprises a metal piece 63 installed at an end portion of the arm 46, a bending portion 66 extending from an edge of the upper yoke 52 and bent downward and contacting with the upper surface of the lower yoke 51, and a slot 67 formed in the bending portion 66.

FIG. 3 is a side view illustrating a conventional voice coil motor coupling structure. FIG. 4 is a perspective view illustrating a method of coupling the conventional voice coil motor on the base plate. In FIGS. 1-4, the same reference numerals indicate the same elements having the same functions.

Referring to FIGS. 3 and 4, a boss 14 protrudes from the upper surface of the base plate 10. The boss 14 is inserted in a boss insertion hole 57 which is provided at one end portion of the lower yoke 51. A screw insertion hole 58 into which a screw 59 is inserted is formed in the other end portion of the lower yoke 51. Additional screw insertion holes 56a and 56b into which screws 59 are inserted are formed at both end portions of the upper yoke 52.

In the above coupling structure, in order to couple the voice coil motor 50 to the base plate 10 the lower yoke 51 and the upper yoke 52 are firmly coupled by a magnetic force of the magnets 53 and 54. While the lower yoke 51 and the upper yoke 52 are coupled, the boss 14 formed on the base plate 10 is inserted into the boss insertion hole 57 provided at one end portion of the lower yoke 51. Then, the lower yoke 51 and the upper yoke 52 are rotated around the boss 14 to match the screw insertion holes 58 and 56b to a screw coupling hole 12 formed in the base plate 10. The coil 56 coupled to a rear end portion of the arm 46 is inserted between the two magnets 53 and 54. The lower yoke 51 and the upper yoke 52 can be rotated since the upper surface of the base plate 10 is flat. Then screws 59 are inserted into the screw insertion holes 56a, 56b, and 58 and coupled to the screw coupling holes 12, so that the lower yoke 51 and the upper yoke 52 are fixedly installed on the base plate 10.

In the conventional hard disk drives, a plurality of disks are installed to increase a data storage capacity. However, with a rapid increase in surface recording density of a disk, one or two disks can store a sufficient amount of data. In particular, hard disk drives using a single disk in which data is recorded on only one side have been developed. Since only one magnetic head and one arm is needed, hard disk drives can be made narrower. In the conventional hard disk drives, a voice coil motor in which magnets are provided at the upper and lower sides of a coil is mainly used. However, in a case of an actuator having only one arm for a single disk, a voice coil motor requiring a single magnet installed only on one of the upper or lower sides of the coil may be desired. Therefore, hard disk drives can be made narrower.

The type of the base plate has changed from a conventional flat type to a bowl type. When the base plate is made into a bowl type, since a flat cover plate is coupled to the base plate by pressing, the cost for manufacturing may be reduced compared to that of the conventional bowl type cover plate manufactured by aluminum die casting. Since the lower yoke and the upper yoke of the voice coil motor may interfere with a protruding side wall of the interior of the bowl type base plate, the voice coil motor cannot be assembled in a state in which the lower yoke and the upper yoke of the voice coil motor are first coupled together. Thus, after the lower yoke is assembled to the base plate, the actuator arm is assembled so that the rear end portion of the actuator arm to which the coil is coupled is disposed above the lower yoke. Then, the upper yoke is coupled to the lower yoke. Since the lower yoke is not first stably fixed to the base plate, when the upper yoke is coupled to the lower yoke, the lower yoke is moved horizontally and vertically by the magnetic force of the magnet attached to the lower surface of the upper yoke, which makes it difficult to couple the voice coil motor. Therefore, a new voice coil motor coupling, structure is needed in the hard disk drive having the above structure.

SUMMARY OF THE INVENTION

Accordingly, it is an aspect of the present invention to provide a voice coil motor coupling structure of a hard disk drive which enables a stable and easy coupling of the lower yoke and the upper yoke of the voice coil motor to the base plate.

Additional aspects and/or advantages of the invention will be set forth in part in the description which follows and, in part, will be obvious from the description, or may be learned by practice of the invention.

The foregoing and/or other aspects of the present invention are achieved by providing a voice coil motor coupling structure of a hard disk drive for coupling a voice coil motor to a base plate of the hard disk drive wherein the voice coil motor comprises a coil coupled to a rear end portion of an actuator arm, an upper yoke and a lower yoke provided at upper and lower portions of the coil, respectively, at a predetermined distance from the coil, and a magnet attached to the lower surface of the upper yoke, the voice coil motor coupling structure comprises a countersink formed in the lower yoke, a countersunk head screw inserted in the countersink and coupled to a screw coupling hole provided in the base plate to fix the lower yoke to the base plate, boss insertion holes formed in each of the lower and upper yokes respectively at both end portions in a lengthwise direction, bosses protruding from the base plate and inserted in the boss insertion holes to prevent horizontal movements of the lower yoke and the upper yoke, and screws inserted in the boss insertion holes and coupled to respective screw coupling holes provided at each boss, fixedly coupling the upper yoke to the lower yoke.

The countersink is provided at a position corresponding to a neutral zone of the magnet.

When the countersunk head screw is inserted in the countersunk, a head portion of the countersunk head screw does not protrude above the upper surface of the lower yoke.

The height of each boss is greater than that of the lower yoke and less than a sum of the heights of the lower yoke and the upper yoke.

A first support portion protruding to a predetermined height and having a diameter greater than that of a lower end portion of the countersink is formed around the screw coupling hole provided in the base plate, and a plurality of second support portions each protruding to a predetermined height and having a diameter greater than that of each of the boss insertion holes is formed around a lower portion of each boss, so that the first and second support portions support the lower yoke to be separated a predetermined distance from the base plate.

Upper surfaces of the first and second support portions are flat and have the same height.

The contact portion provided on the lower yoke to lock the actuator and bent such that an upper surface of the contact portion is lower than an upper surface of the lower yoke. A recess having a predetermined depth is formed in the base plate to avoid interference with the contact portion of the lower yoke.

Although the base plate is of a bowl type, the voice coil motor coupling structure may be applied to a hard disk drive having a flat type base plate.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
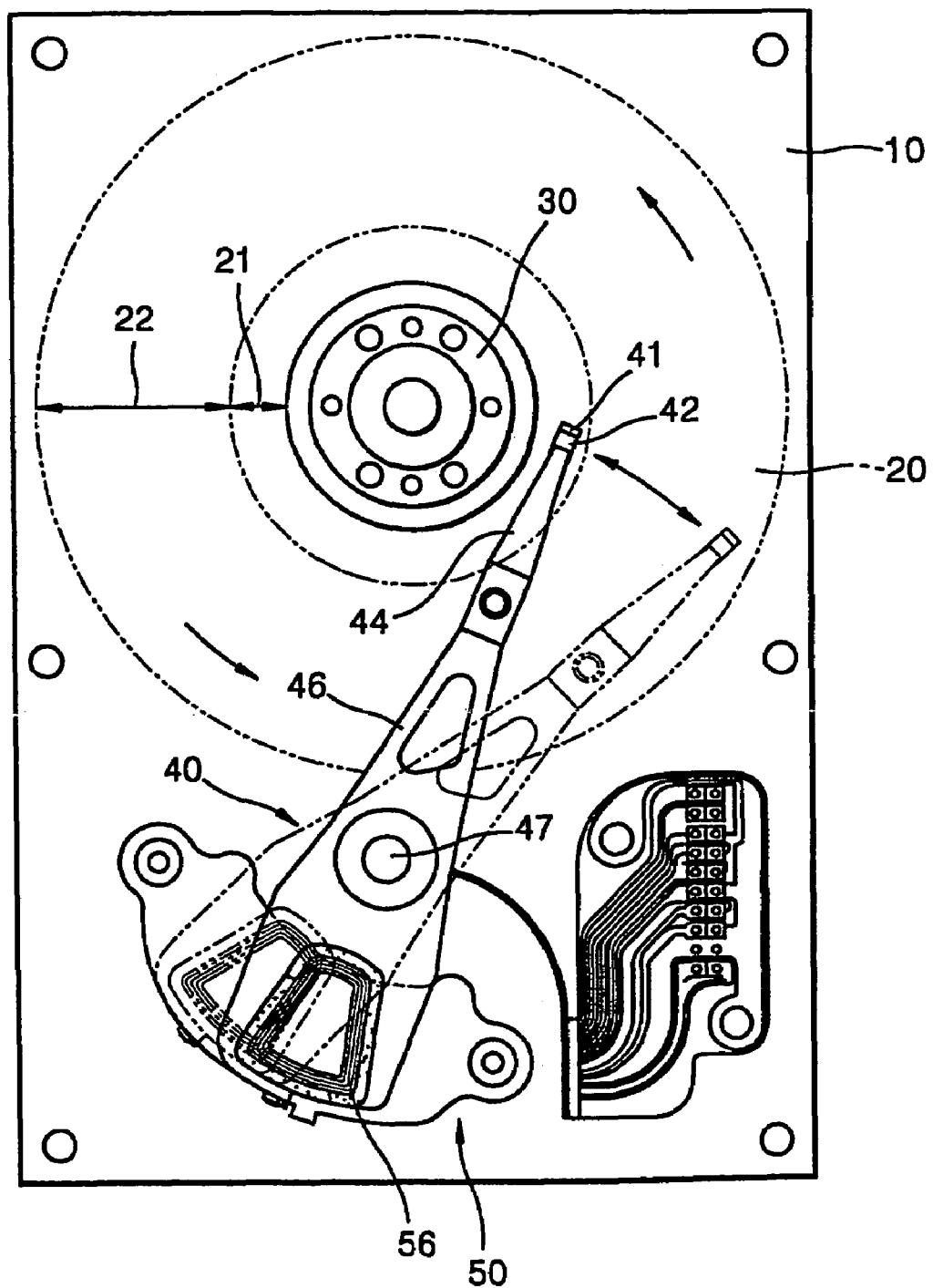
FIG. 1 is a plan view illustrating a conventional hard disk drive.
Figure 2:
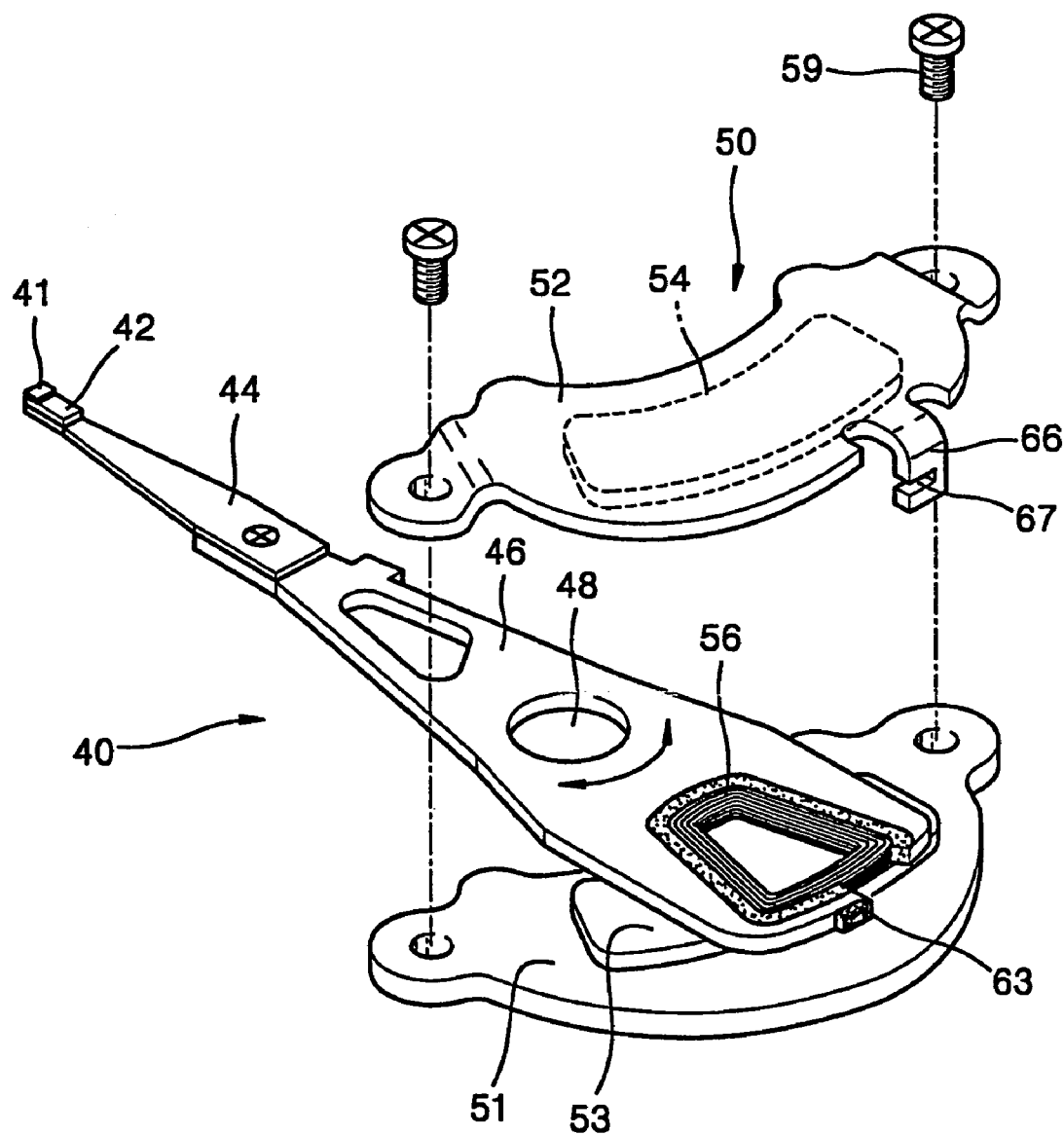
FIG. 2 is an exploded perspective view illustrating a conventional actuator and a conventional voice coil motor in FIG. 1.
Figure 3:
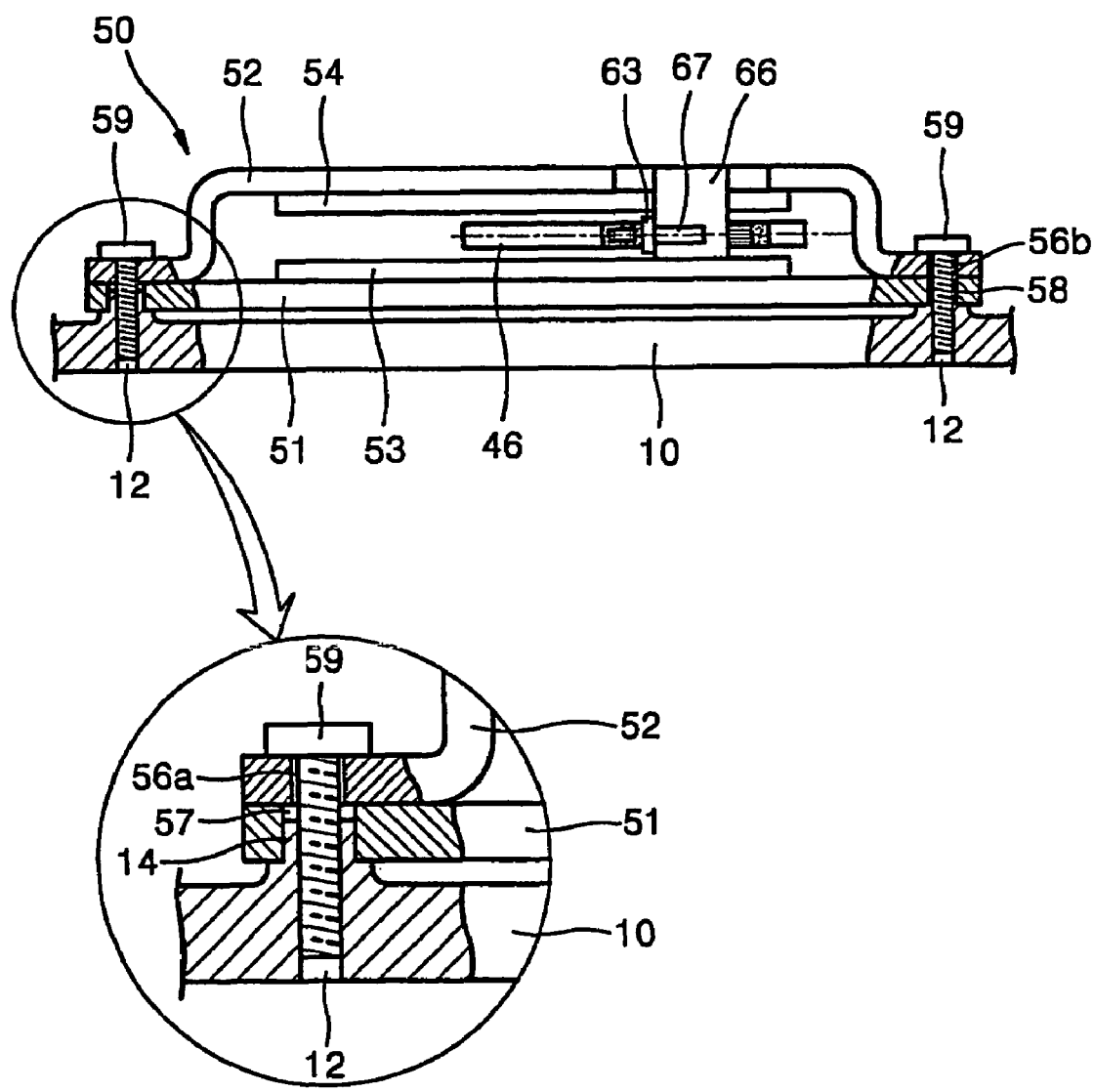
FIG. 3 is a side view illustrating a portion of the voice coil motor to show a conventional voice coil motor coupling structure.
Figure 4:
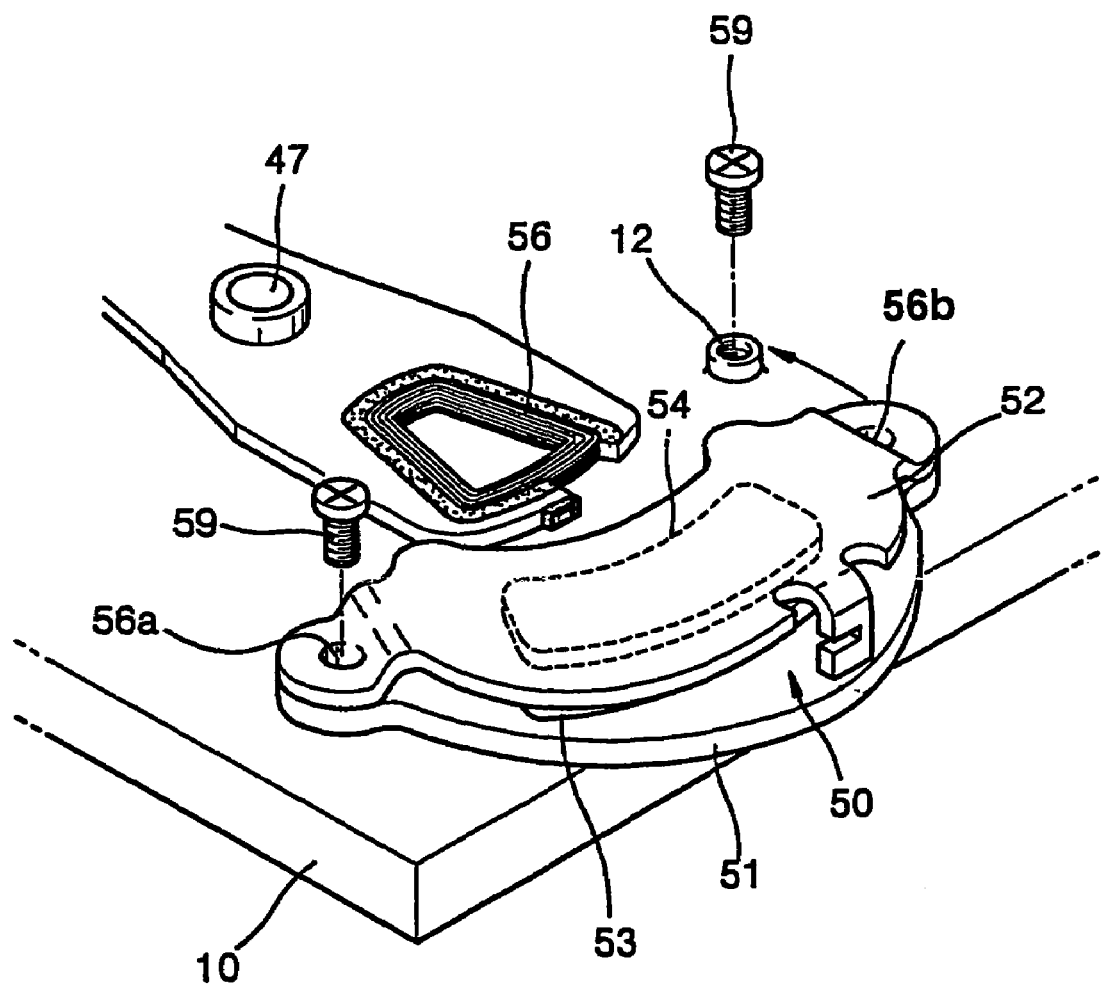
FIG. 4 is a perspective view illustrating a method of coupling the conventional voice coil motor to the base plate.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 5:
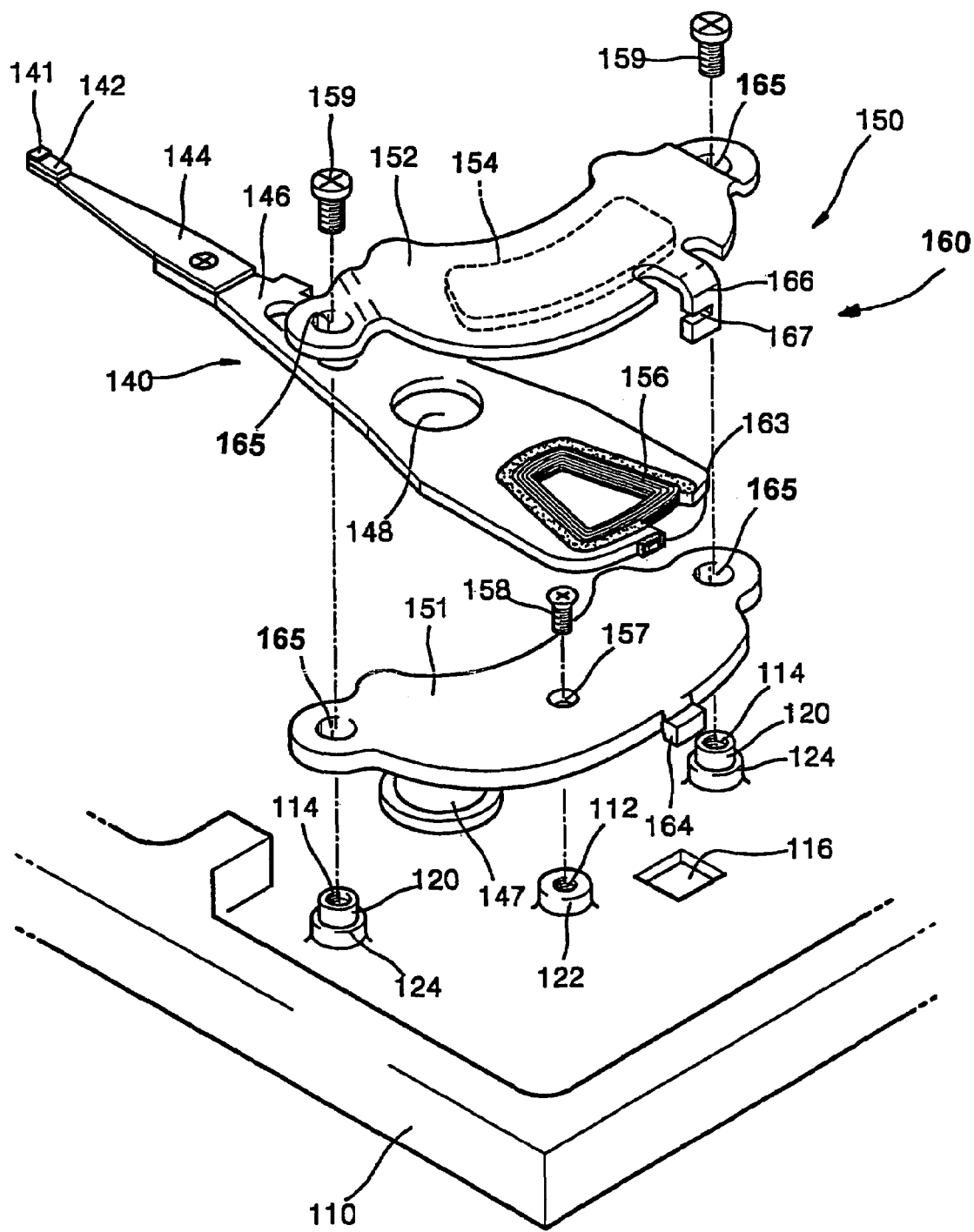
FIG. 5 is an exploded perspective view illustrating a voice coil motor coupling structure according to an embodiment of the present invention.
Figure 6:
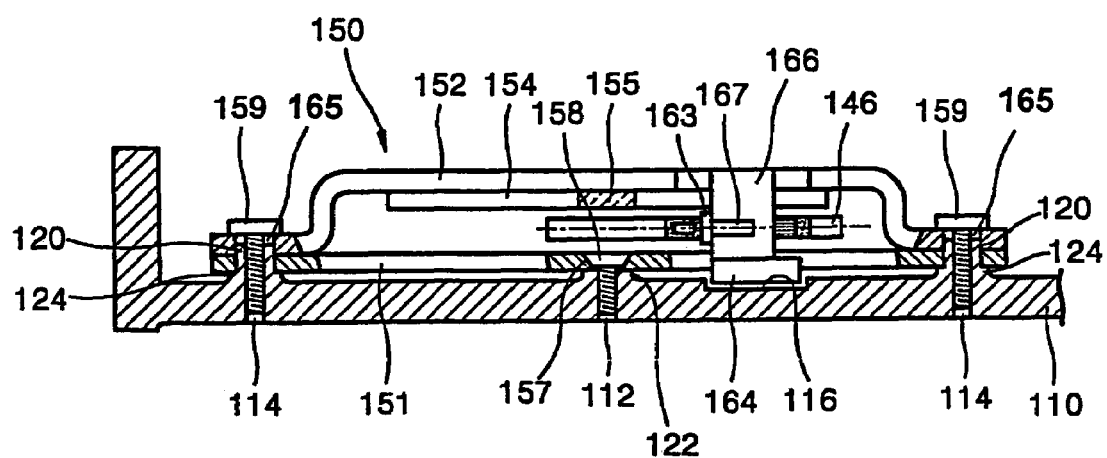
FIG. 6 is a side view illustrating the voice coil motor of FIG. 5 coupled to a base plate.

Referring to FIGS. 5 and 6, a hard disk drive includes an actuator 140 to move a magnetic head 141 for recording and reproduction of data to a predetermined position on a disk (not shown). The actuator 140 includes an arm 146 installed on a base plate 110 capable of pivoting. A pivot hole 148 is formed in a middle portion of the arm 146 and a pivot shaft 147 installed on the base plate 110 is inserted into the pivot hole 148. The magnetic head 141 is mounted on a slider 142 and a suspension 144 elastically supporting the slider 142 toward a surface of the disk is installed at one end portion of the arm 146.

A voice coil motor 150 pivoting the actuator 140 is installed in the hard disk drive. The voice coil motor 150 comprises a coil 156 coupled to the other end portion of the arm 146, a lower yoke 151 installed under the coil 156 at a predetermined distance from the coil 156, and an upper yoke 152 installed above the coil 156. A magnet 154 is attached to a lower surface of the upper yoke 152 at a predetermined distance from the coil 156.

The voice coil motor 150 having the above structure and controlled by a servo control system pivots the actuator 140 in a direction based on the direction of the current applied to the coil 156 and the direction of a magnetic field generated by the magnet 154. When the power of the hard disk drive is turned on and the disk starts to rotate, the voice coil motor 150 moves the magnetic head 141 from a parking zone (not shown) to a data zone (not shown) of the disk. In contrast, when the power of the hard disk drive is turned off and the disk stops rotating, the voice coil motor 150 pivots the arm 146 to move the magnetic head 141 from the data zone to the parking zone of the disk.

The voice coil motor 150 of a one magnet type is installed on the base plate 110. When the base plate 110 is a bowl type, the voice coil motor 150 is installed as follows. First, the lower yoke 151 of the voice coil motor 150 is fixed to the base plate 110. Next, the arm 146 is assembled to the pivot shaft 147. Then, the upper yoke 152 is coupled to the lower yoke 151.

In order to install the voice coil motor 150 on the bowl type base plate 110 in the above method, the following coupling structure is provided.

A countersink 157 having an inclined angle of about 45° is formed in the lower yoke 151 of the voice coil motor 150. A screw coupling hole 112 is provided at the base plate 110 at a position corresponding to the countersink 157. A countersunk head screw 158 is inserted into the countersink 157. As the countersunk head screw 158 is coupled to the screw coupling hole 112, the lower yoke 151 is fixed to the base plate 110. When the countersink 157 and the countersunk head screw 158 are used, the contact area increases, and the lower yoke 151 can be more firmly fixed to the base plate 110. Also, since the lower yoke 151 is firmly fixed to the base plate 110, when the upper yoke 152 is coupled to the lower yoke 151, the lower yoke is prevented from being moved by a magnetic force of the magnet 154 attached to the upper yoke 152.

The countersink 157 is formed at a position corresponding to a neutral zone 155 which is a middle portion between the N pole and the S pole of the magnet 154. Thus, the countersink 157 provided at the lower yoke 151 and the countersunk head screw 158 inserted therein do not affect a magnetic force of the magnet 157 attached to the lower surface of the upper yoke 152.

When the countersunk head screw 158 is inserted in the countersink 157, the head of the countersunk head screw 158 does not protrude above the upper surface of the lower yoke 151. This is to prevent the countersunk head screw 158 from interfering with the arm 146 since the interval between the lower yoke 151 and the arm 146 is very small.

Boss insertion holes 165 are formed in each of the lower yoke 151 and the upper yoke 152 respectively at both end portions in a lengthwise direction. Bosses 120 protrude from the base plate 110 at a position corresponding to the boss insertion holes 165. The bosses 120 inserted in the boss insertion holes 165, prevent horizontal movements of the lower yoke 151 and the upper yoke 152. Also, each boss 120 functions as a standard in coupling the lower yoke 151 and the upper yoke 152 at an accurate position.

A screw 159 is coupled to a screw coupling hole 114 formed in each boss 120. Each boss 120 is formed higher than the height of the lower yoke 151 and lower than a sum of the heights of the lower yoke 151 and the upper yoke 152. As a result, a coupling force of each screw 159 is applied to the upper yoke 152 and the lower yoke 151 when the screws 159 are coupled to each of the screw coupling holes 114.

The screws 159 are inserted in the boss insertion holes 165 in a state in which the upper yoke 152 is placed on the lower yoke 151 and coupled to each of the screw coupling holes 114 provided in the boss 120. Accordingly, the upper yoke 152 is fixedly coupled to the lower yoke 151. Simultaneously, the upper and lower yokes 152 and 151 can be firmly coupled to the base plate 110.

Since the base plate 110 is typically manufactured by aluminum die casting, the upper surface thereof is not sufficiently flat. Thus, the entire lower surface of the lower yoke 151 may not directly contact with the upper surface of the base plate 110. Accordingly, a first support portion 122 having a predetermined height and a diameter greater than that of the lower end portion of the countersink 157 protrudes around the screw coupling hole 112 where the countersunk head screw 158 is coupled. Two second support portions 124 having a predetermined height and a diameter greater than that of the boss insertion holes 165 protrude around the lower portion of each boss 120. In this case, the upper surfaces of the first and second support portions 122 and 124 are cut and processed to be flat and have the same height.

Thus, since the lower yoke 151 is supported at the first support portion 122 and the plurality of second support portions 124 (at least three points in this instance), it can be stably supported at a predetermined distance from the base plate 110.

In addition, the hard disk drive comprises an actuator locking apparatus 160. When the electric power of the hard disk drive is turned off, the actuator locking apparatus 160 locks the actuator 140 to maintain a state in which the magnetic head 141 mounted on the actuator 140 is parked in the parking zone of the disk. Thus, the actuator locking apparatus 160 prevents the actuator 140 from being moved to the data zone out of the parking zone by unnecessarily pivoting due to an external impact during which the power is turned off and preventing potential damage to the data zone and the magnetic head 141. If the magnetic head 141 is moved to the data zone in the power off state, the magnetic head 141 directly contacts the data zone and accordingly the data zone and the magnetic head 141 may be damaged.

The actuator locking apparatus 160 locks the actuator 140 using the magnetic force of the magnet 154 attached to the lower surface of the upper yoke 152 of the voice coil motor 150. The actuator locking apparatus 160 comprises a metal piece 163 installed at an end portion of the arm 146, a bending portion 166 provided at the upper yoke 152 and having a slot 167 having a predetermined width, and the lower surface of the bending portion 166 contacts with a contact portion 164 provided at the lower yoke 151. The upper yoke 152 is magnetized by the magnet 153 attached to the lower surface thereof. Accordingly, a magnetic flux flows from the bending portion 166 of the upper yoke 152 toward the contact portion 164 of the lower yoke 151. The magnetic flux leaks at a portion around the slot 167 and the metal piece 163 installed at the arm 146 adheres to the bending portion 166 around the slot 167 by a leakage magnetic flux.

In the actuator locking apparatus 160, the contact portion 164 protrudes from the side surface of the lower yoke 151 and is bent such that the upper surface thereof is lower than the upper surface of the lower yoke 151 to reinforce the strength of a portion under the slot 167 by increasing the height of the portion under the slot 167 of the bending portion 166. Accordingly, the portion under the slot 167 is prevented from being bent when the upper yoke 152 is-coupled to the lower yoke 151.

When the contact portion 164 is bent lower than the lower yoke 151, the lower surface of the contact portion 164 interferes with the upper surface of the base plate 110 so that the lower yoke 151 is not installed horizontally on the base plate 110. Therefore, a recess 116 having a predetermined depth may be formed in the upper surface of the base plate 110 to prevent contact between the contact portion 164 and the base plate 110. Accordingly, the lower yoke 151 can be stably fixed to the base plate 110.

As described above, in the voice coil motor coupling structure of a hard disk drive according to the present invention, the lower yoke of the voice coil motor can be stably fixed at an accurate position not only on a flat type base plate but also on a bowl type base plate. Also, the upper yoke can be easily coupled to the lower yoke.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A voice coil motor coupling structure of a hard disk drive for coupling a voice coil motor to a base plate of the hard disk drive, the voice coil motor including a coil coupled to a rear end portion of an actuator arm, an upper yoke and a lower yoke provided at upper and lower portions of the coil, respectively, separated at a predetermined distance from the coil, and a magnet attached to the lower surface of the upper yoke, the voice coil motor coupling structure comprising:
   a countersink formed in the lower yoke;
   a countersunk head screw inserted in the countersink and coupled to a screw coupling hole provided in the base plate to fix the lower yoke to the base plate;
   boss insertion holes formed in each of the lower and upper yokes respectively at both end portions in a lengthwise direction;
   bosses protruding from the base plate and inserted in the boss insertion holes; and
   screws inserted in the boss insertion holes and coupled to respective screw coupling holes provided at each boss, fixedly coupling the upper yoke to the lower yoke.

2. The voice coil motor coupling structure of claim 1, wherein the countersink is provided at a position corresponding to a neutral zone of the magnet.

3. The voice coil motor coupling structure of claim 1, wherein, when the countersunk head screw is inserted in the countersink, a head portion of the countersunk head screw does not protrude above the upper surface of the lower yoke.

4. The voice coil motor coupling structure of claim 1 wherein the height of each boss is greater than that of the lower yoke and less than a sum of the heights of the lower yoke and the upper yoke.

5. The voice coil motor coupling structure of claim 1, further comprising a first support portion protruding to a predetermined height and having a diameter greater than a lower end portion of the countersink and formed around the screw coupling hole provided in the base plate, and a plurality of second support portions, each protruding to a predetermined height and having a diameter greater than each of the boss insertion holes is formed around a lower portion of each boss, so that the first and second support portions support the lower yoke at a predetermined distance from the base plate.

6. The voice coil motor coupling structure of claim 5, wherein upper surfaces of the first and second support portions are flat and have the same height.

7. The voice coil motor coupling structure of claim 1, further comprising:
   an actuator locking apparatus.

8. The voice coil motor coupling structure of claim 7, wherein the actuator locking apparatus comprises:
   a metal piece installed at an end portion of the actuator arm;
   a bending portion provided on the upper yoke;
   a slot provided on the bending portion having a predetermined width; and
   a contact portion provided on the lower yoke and bent such that an upper surface of the contact portion is lower than an upper surface of the lower yoke.

9. The voice coil motor coupling structure of claim 8, wherein a lower surface of the bending portion contacts with the contact portion.

10. The voice coil motor coupling structure of claim 8, further comprising:
    a recess formed in the base plate, having a predetermined depth wherein the contact portion is inserted.

11. The voice coil motor coupling structure of claim 1, wherein the base plate is of a bowl type.

12. A hard disk drive comprising:
    a voice coil motor having a coil coupled to a rear end portion of an actuator arm;
    an upper yoke and a lower yoke provided at upper and lower portions of the coil respectively, separated at a predetermined distance from the coil;
    a magnet attached to the lower surface of the upper yoke;
    a bowl-type base plate having a plurality of flattened structures for fastening the lower yoke in a position relative to the bowl-type base plate;
    a countersink formed in the lower yoke;
    a countersunk head screw inserted in the countersink and coupled to a screw coupling hole provided in the bowl-type base plate to fix the lower yoke to the bowl-type base plate; and
    a first support portion protruding to a predetermined height and having a diameter greater than a lower end portion of the countersink and formed around the screw coupling hole provided in the base plate.

13. The hard disk drive of claim 12, wherein the plurality of flattened structures each protrude to the predetermined height so that the first support portion and the plurality of flattened structures support the lower yoke at a predetermined distance from the base plate.

* * * * *

UNITED STATES PATENT AND TRADEMARK OFFICE
CERTIFICATE OF CORRECTION

PATENT NO. : 7,289,301 B2
APPLICATION NO. : 10/677329
DATED : October 30, 2007
INVENTOR(S) : Do-Wan Kim et al.

It is certified that error appears in the above-identified patent and that said Letters Patent is hereby corrected as shown below:

Column 7, Line 34, after "1" insert --,--.

Signed and Sealed this

Fifteenth Day of April, 2008

JON W. DUDAS
*Director of the United States Patent and Trademark Office*